UNITED STATES PATENT OFFICE.

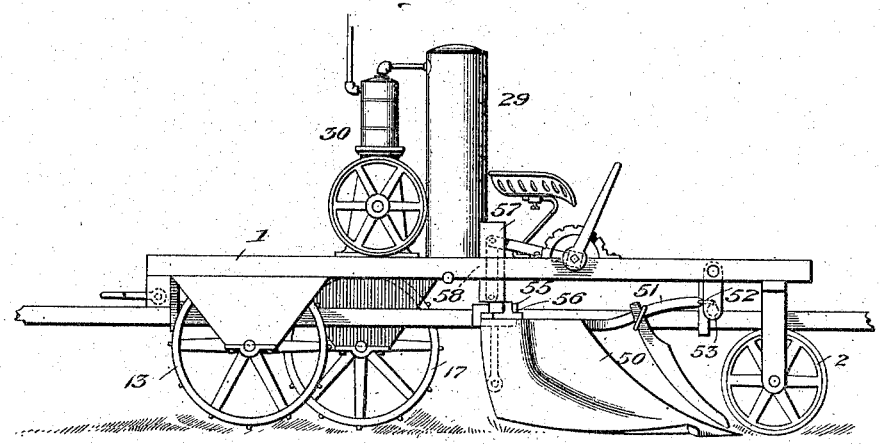
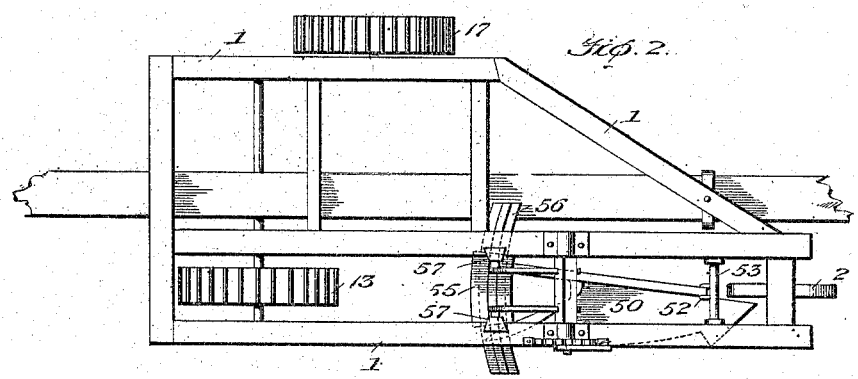
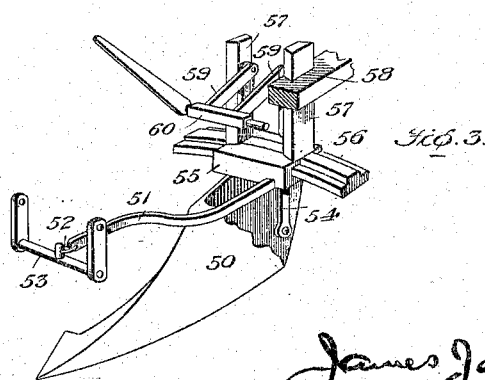

JAMES JOSHUA MIDDLEBROOK, OF SAULT STE. MARIE, MICHIGAN.

MOTOR-PLOW.

957,979.

Specification of Letters Patent. Patented May 17, 1910.

Original application filed February 23, 1909, Serial No. 479,316. Divided and this application filed July 2, 1909. Serial No. 505,720.

*To all whom it may concern:*

Be it known that I, JAMES JOSHUA MIDDLEBROOK, a subject of the King of Great Britain, residing at Sault Ste. Marie, county of Chippewa, and State of Michigan, have invented certain new and useful Improvements in Motor-Plows, of which the following is a specification.

This invention relates to plows.

The present invention, which is a division of my copending application, Serial No. 479,316, filed Feb. 23, 1909, has for its object the provision of novel means for supporting a plow and adjusting it in relation to the wheeled carrying vehicle therefor, being especially designed for use as a motor plow, propelled by suitable mechanism, preferably that set forth in my aforesaid earlier filed application.

The invention is carried out by the provision of novel means whereby the plow may be raised and lowered in relation to the motor plow frame and whereby it may swing or move laterally as will appear more fully hereinafter.

In the accompanying drawings:—Figure 1 is a side elevation, the driving mechanism for the motor plow being omitted; Fig. 2, a plan view showing so much of the plow frame as will enable the invention to be fully understood; and Fig. 3, a perspective detail of the adjusting and supporting devices.

The frame 1 of the machine has a steering wheel 2 and traction wheels 13 and 17 of any preferred form and arrangement and may carry any suitable motor for propelling it as, for instance, a gasolene tank 29 and gasolene engine 30.

The plow 50 has its beam 51 connected by a clevis 52 to a rocker 53 depending from frame 1, which permits the plow to properly operate. Secured to the rear end of the plow is a link 54 to the upper end of which is attached a slide 55 which is adapted to slip laterally on an arc-shaped guide 56, which is provided with vertical guides 57 slidable in guide-ways 58 in the frame 1. Articulated connections 59 connect the guides 57 with a rocker 60, which is adapted to be operated by a lever 61. This construction permits elevation of the rear end of the plow as may be desired so that it will be adapted to cut as deep a furrow as desired, while the plow is also adapted to swing laterally at its rear part, and hence all inequalities of the ground being plowed are compensated for and the plow automatically adapts itself to the direction of travel of the machine.

Having thus described my invention, what I claim as new and desire to secure by Letters Patent, is:—

In a plow, the combination with a wheeled frame having vertically disposed guideways, of a transversely disposed arc-shaped guide disposed below the frame aforesaid, vertically disposed guides secured to said transversely disposed guide and slidable in the guideways, a plow having a beam pivoted to the frame, a slide to which the plow is secured which is slidable on said transversely disposed guide so that it can swing sidewise of the frame, and raising and lowering mechanism directly coöperating with the vertically disposed guides for raising and lowering them.

In testimony whereof, I hereunto affix my signature in presence of two witnesses.

JAMES JOSHUA MIDDLEBROOK.

Witnesses:
J. O. COLWELL,
JNO. A. COLWELL.